(12) United States Patent
Neville

(10) Patent No.: US 10,023,316 B2
(45) Date of Patent: Jul. 17, 2018

(54) MOBILE SEAT SYSTEMS THAT UTILIZE SEAT TRACKS

(71) Applicant: The Boeing Company, Chicago, IL (US)

(72) Inventor: Kathryn Mary Neville, Seattle, WA (US)

(73) Assignee: The Boeing Company, Chicago, IL (US)

(*) Notice: Subject to any disclaimer, the term of this patent is extended or adjusted under 35 U.S.C. 154(b) by 477 days.

(21) Appl. No.: 14/738,875

(22) Filed: Jun. 13, 2015

(65) Prior Publication Data

US 2016/0362181 A1    Dec. 15, 2016

(51) Int. Cl.
  *B64D 11/06* (2006.01)
  *H01R 13/627* (2006.01)
  *H02G 3/38* (2006.01)
  *H01R 25/14* (2006.01)

(52) U.S. Cl.
  CPC ...... *B64D 11/0624* (2014.12); *B64D 11/0696* (2013.01); *H02G 3/383* (2013.01); *H01R 25/142* (2013.01)

(58) Field of Classification Search
  None
  See application file for complete search history.

(56) References Cited

U.S. PATENT DOCUMENTS

| 7,185,850 | B2 | 3/2007 | Callahan et al. | |
|---|---|---|---|---|
| 7,191,981 | B2 | 3/2007 | Laib et al. | |
| 8,033,501 | B2 | 10/2011 | Callahan et al. | |
| 2006/0035518 | A1* | 2/2006 | Hueber | B64C 1/20 439/532 |
| 2007/0018045 | A1* | 1/2007 | Callahan | B64C 1/20 244/118.6 |
| 2013/0106177 | A1* | 5/2013 | Imbert | B64D 11/0696 307/9.1 |
| 2013/0167817 | A1* | 7/2013 | Bauer | H02J 5/005 123/621 |
| 2013/0340364 | A1* | 12/2013 | Haselmeier | E04C 2/52 52/220.2 |

* cited by examiner

*Primary Examiner* — Jared Fureman
*Assistant Examiner* — Joel Barnett
(74) *Attorney, Agent, or Firm* — Duft Bornsen & Fettig LLP

(57) ABSTRACT

Embodiments herein provide an interface that adjusts for distance changes between mobile seats. One embodiment comprises an elongated housing having a bottom side that mounts to a seat track, an opposing top side having an opening, and side walls between the bottom side and the top side. The housing has a front side that receives an end of a seat track cover within an interior space of the housing. The surfaces of the side walls within the interior space include pairs of slots in opposition that extend from the top side toward the bottom side. The pairs of slots receive an electrical connector of the seat, and mate it to an electrical connector of the seat track cover. A spacing of the pairs of slots along a length of the housing defines a variable distance between the end of the seat track cover and a leg of the seat.

20 Claims, 8 Drawing Sheets

MOBILE SEAT SYSTEMS THAT UTILIZE SEAT TRACKS

FIELD

This disclosure relates to the field of aircraft seat track systems, and in particular, to interfaces used to connect electrical systems in a seat to electrical wiring in seat track covers that span the distances along the tracks between seats.

BACKGROUND

Rows of seats on modern aircraft are often mounted to seat tracks that run along the floor of the passenger cabin. The rows of seats are secured to the tracks and allow for the spacing between the rows to be adjusted as desired. For instance, an airline may decide after initial delivery of the aircraft to reduce the spacing between the rows and enable more seats to be installed in the aircraft, to increase the spacing between the rows and enable fewer seats to be installed in the aircraft, etc. The spacing between the rows is sometimes referred to as the seat pitch. Reconfiguring the seat pitch can be referred to in the aircraft industry as a seat re-pitch or simply, a re-pitch.

Seats in modern aircraft include a number of electrical and/or electronic systems that are used by passengers. For instance, the seats may include displays, headphone connections, controls to adjust channels for audio/video, etc. Power and/or data are typically provided to the seats utilizing electrical wiring that runs along the tracks or alongside the tracks. The wiring is often daisy-chained from one row to the next row along the tracks for simplicity.

A seat track cover is used to cover the exposed tracks between the rows as well as the row-to-row wiring. The track cover is mounted on the track, and is either wide enough to cover wiring that runs alongside the track, or is sized to cover the track and allow electrical wiring to run inside of the track cover.

If an airline makes a decision to re-pitch the seats on the aircraft and their track system contains electrical wiring in the track cover, then the track covers are often either too short or too long to accommodate the new seat pitch. The track covers are often discarded in this case, and new track covers are fabricated based on the new seat pitch. However, this process is expensive and time consuming.

SUMMARY

Embodiments herein provide an interface between the seats and the track covers that allows for distance changes between seats that may arise during a re-pitch.

One embodiment comprises an apparatus that is configured to couple an electrical connector of a seat to an electrical connector that is disposed on an end of a seat track cover. The apparatus comprises an elongated housing having a bottom side that mounts to a seat track, an opposing top side having an opening, and side walls between the bottom side and the top side. The housing has a front side that receives the end of the seat track cover within an interior space of the housing, and a back side proximate to a leg of the seat. The surfaces of the side walls within the interior space include pairs of slots in opposition across the interior space that extend from the top side toward the bottom side and have a spacing along a length of the housing. The pairs of slots receive the electrical connector of the seat, and mate the electrical connector of the seat to the electrical connector of the seat track cover. The spacing of the pairs of slots along the length of the housing defines a variable distance between the end of the seat track cover and the leg of the seat.

Another embodiment comprises an apparatus for communicating electrical signals between spaced apart mobile seats. The apparatus comprises a seat track, a seat track cover, and a pair of interfaces. The seats are affixed to the track utilizing seat legs. The seat track cover is mounted to the seat track between the seat legs, and the seat track cover includes wiring that electrically couples connectors at apposing ends of the seat track cover. Each of the seat track interfaces is disposed between one of the seat legs and one of the ends of the seat track cover. Each of the interfaces includes an elongated housing having a bottom side that mounts to the seat track, an opposing top side having an opening, and side walls between the bottom side and the top side. The housing has a front side that receives one of the ends of the seat track cover within an interior space of the housing, and a back side proximate to one of the seat legs. Surfaces of the side walls within the interior space include pairs of slots in opposition across the interior space that extend from the top side toward the bottom side and have a spacing along a length of the housing. The pairs of slots receive an electrical connector from one of the seats, and mate it to one of the connectors of the seat track cover. The spacing of the pairs of slots along the length of the housing defines a variable distance between one of the ends of the seat track cover and one of the seat legs.

Another embodiment comprises a system that includes a seat track, a first seat removably coupled to the seat track at a first seat leg, and a second seat spaced apart from the first seat along the seat track that is removably coupled to the seat track at a second seat leg. The system further includes a seat track cover mounted to the seat track between the first seat leg and the second seat leg. The seat track cover includes an electrical connector at a first end that is proximate to the first seat leg and an electrical connector at a second end that is proximate to the second seat leg. The system further includes a first interface mounted to the seat track between the first seat leg and the first end of the seat track cover, and a second interface mounted to the seat track between the second seat leg and the second end of the seat track cover. The first interface receives the first end of the seat track cover within an interior space that includes pairs of slots in opposition across the interior space. The pairs of slots receive an electrical connector of the first seat, and mate it to the electrical connector at the first end of the seat track cover. The second interface receives an electrical connector of the second seat, and mates it to the electrical connector at the second end of the seat track cover. Spacing for the pairs of slots along a length of the first interface defines a variable distance between the first end of the seat track cover and the first seat leg.

The above summary provides a basic understanding of some aspects of the specification. This summary is not an extensive overview of the specification. It is not intended to identify key or critical elements of the specification or delineate any scope of particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the disclosure is not limited to the specific embodiments or examples described below, but by the claims and their equivalents.

Figure 1:
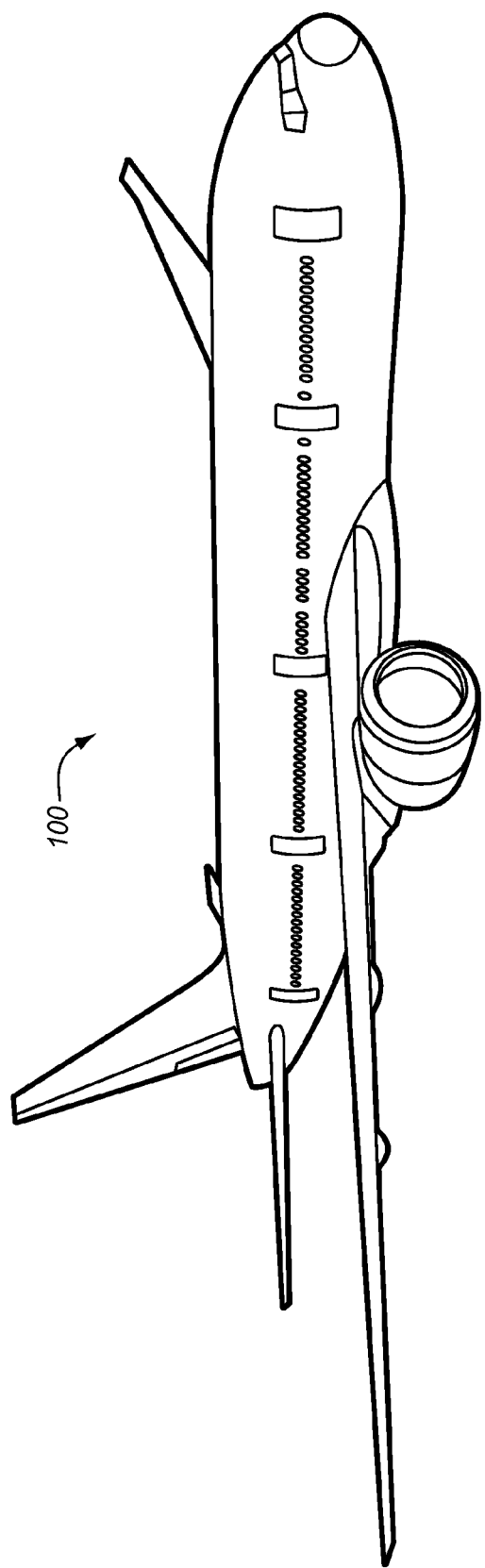
FIG. 1 is a diagrammatic representation of an aircraft implementing a seat track system in an exemplary embodiment.

FIG. 1 is a diagrammatic representation of an aircraft 100 implementing a seat track system (not shown) in an exemplary embodiment. In this embodiment, the seat track system is used to secure seats and/or rows of seats to the floor of a passenger cabin onboard aircraft 100, and allows for electrical connections (e.g., data and/or electrical power) to be routed between rows onboard aircraft 100. In the embodiments described, the track system onboard aircraft 100 includes a specialized interface that allows for distance changes between rows of seats that may arise during a re-pitch. How the interface enables this functionality will become more readily apparent upon reviewing the following discussion and associated figures.

Figure 2:
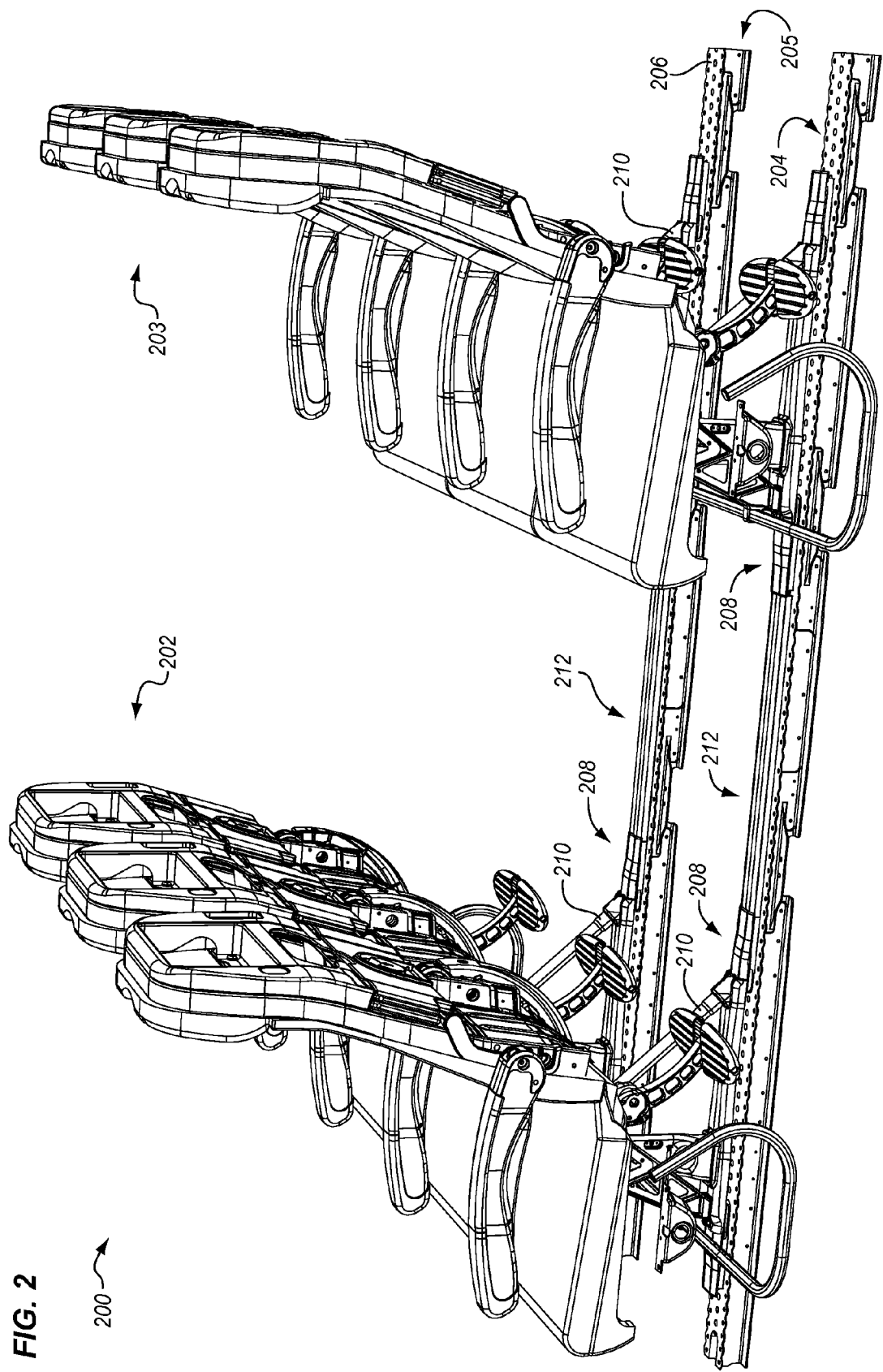
FIG. 2 is a diagrammatic representation of a portion of a seat track system that may be utilized onboard an aircraft in an exemplary embodiment.

FIG. 2 is a diagrammatic representation of a portion of a seat track system 200 that may be utilized onboard aircraft 100 (see FIG. 1) in an exemplary embodiment. In this embodiment, adjacent rows of seats 202-203 are mounted to a pair of seat tracks 204-205 that run along a floor of the passenger cabin of aircraft 100. Although only two seat tracks 204-205 are illustrated in FIG. 2, seat track system 200 may utilize more or fewer seat tracks 204-205 as desired. Further, each of rows of seats 202-203 may include more or fewer seats as desired.

In this embodiment, seat tracks 204-205 include a plurality of openings 206 that are fabricated into a top planar surface of seat tracks 204-205. Openings 206 in seat tracks 204-205 are capable of securing a number of different elements to seat tracks 204-205, such as rows of seats 202-203. Although a particular type of seat tracks 204-205 is illustrated in FIG. 2, a number of different track configurations are used in modern mobile seating options onboard aircraft. Thus, seat track system 200 is not limited to only the configuration of seat tracks 204-205 illustrated in FIG. 2.

In this embodiment, seat track system 200 includes a number of interfaces 208 that are mounted to seat tracks 204-205 proximate to legs 210. Interfaces 208 are capable of receiving electrical connections from rows of seats 202-203 (not shown in this view), and mating the electrical connections to electrical wiring in seat track covers 212 that mount to seat tracks 204-205. Seat track covers 212 span the majority of space between rows of seats 202-203. Seat track covers 212 protect seat tracks 204-205 from debris and also provide electrical connections along seat tracks 204-205 between rows of seats 202-203.

Figure 3:
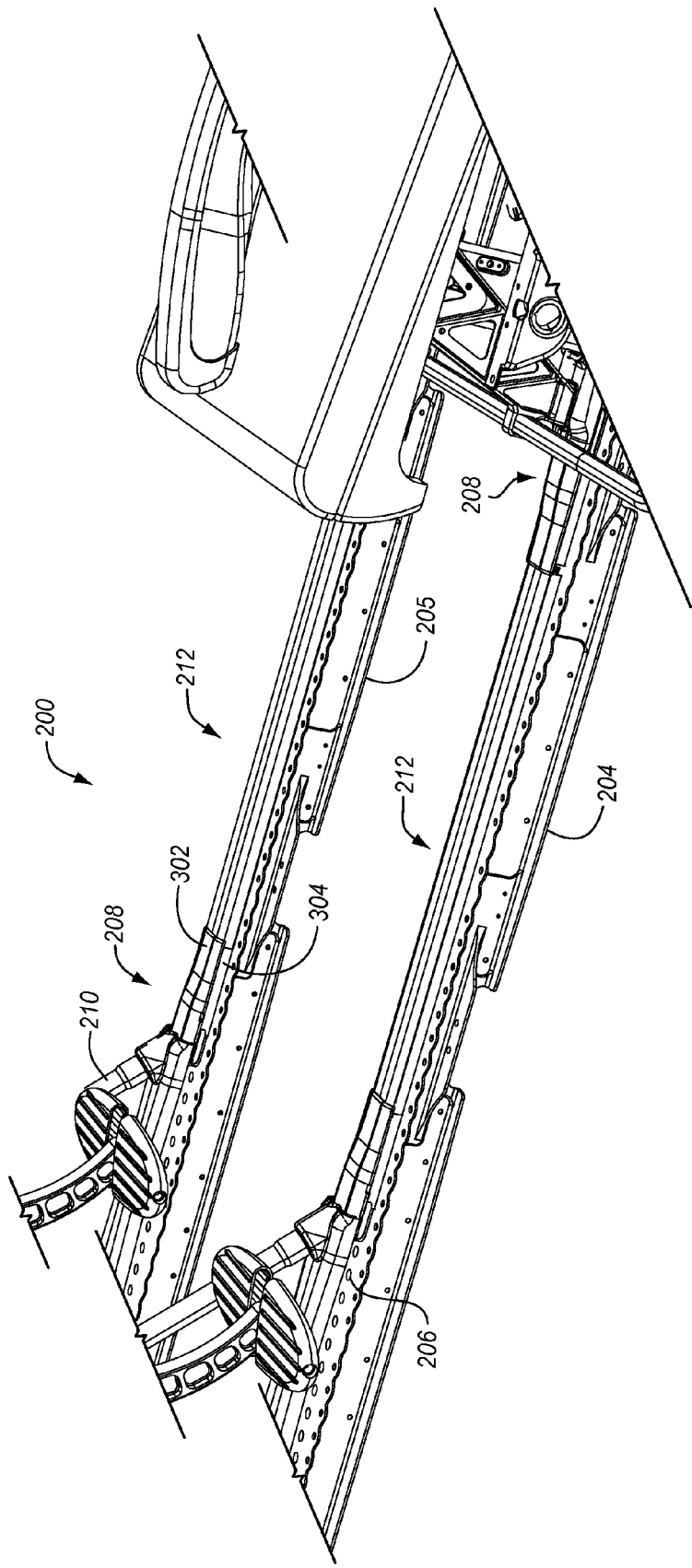
FIG. 3 is a diagrammatic representation of an interface and a seat track cover for a seat track system in an exemplary embodiment.

FIG. 3 is a diagrammatic representation of interface 208 and seat track cover 212 for seat track system 200 in an exemplary embodiment. In FIG. 3, interface 208 is more clearly visible, and includes a lid 302 that is secured to a housing 304. Lid 302 is capable of being rotated into an open position, which will expose an opening through a top surface of housing 304 and allow an electrical connector from rows of seats 202-203 to mate to electrical wiring in seat track cover 212 Lid 302 is also removable in some embodiments. Interface 208 will be discussed later with respect to FIG. 5.

Figure 4:
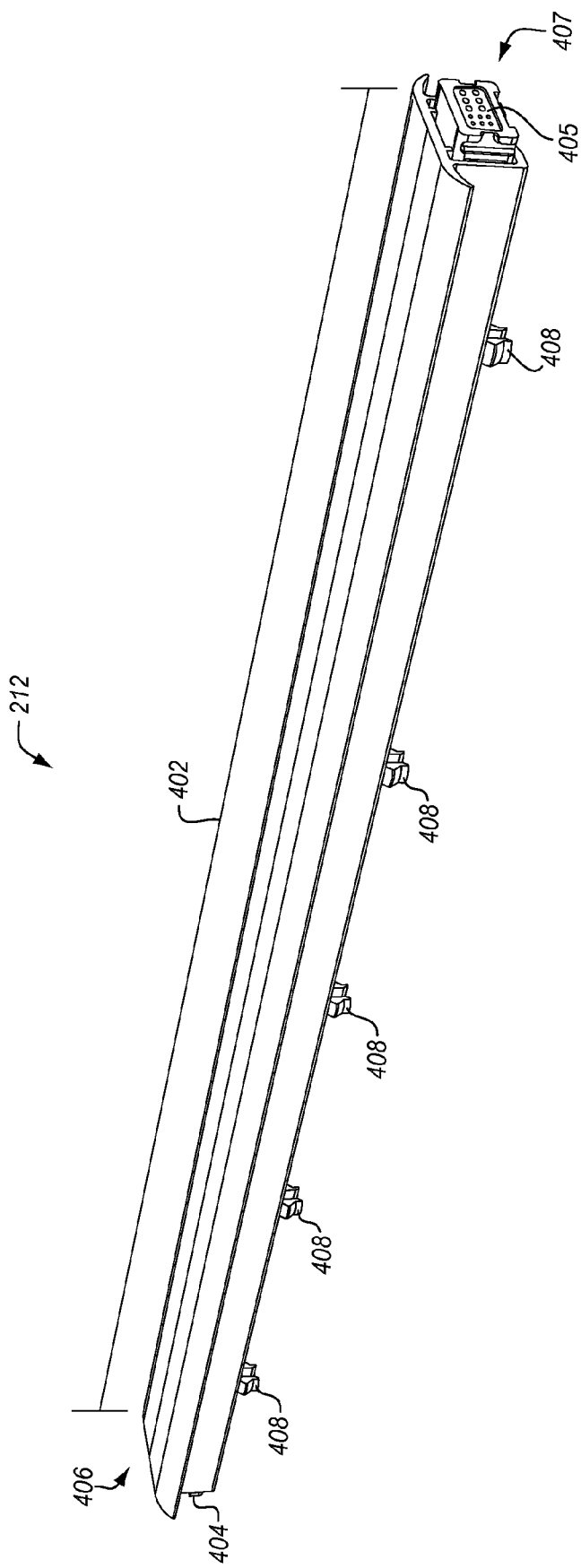
FIG. 4 is a diagrammatic representation of a seat track cover in an exemplary embodiment.

FIG. 4 is a diagrammatic representation of seat track cover 212 in an exemplary embodiment. Seat track cover 212 has a long axis 402 that runs perpendicular to seat tracks 204-205, with electrical connectors 404-405 disposed on opposing ends 406-407 of seat track cover 212. Not visible in FIG. 4 is electrical wiring that runs inside of seat track cover 212 between electrical connectors 404-405.

Seat track cover 212 in this embodiment includes a plurality of engagement features 408 that are spaced along long axis 402, and are capable of being snapped or pressed into openings 206 of seat tracks 204-205 to secure seat track cover 212 to seat tracks 204-205 (see FIG. 3). For instance, engagement features 408 may include a snap joint or some other type of deformable plastic or metal protrusion that enables seat track cover 212 to be removably secured to seat tracks 204-205. During a re-pitch, seat track covers 212 may be removed from seat tracks 204-205 and re-positioned on seat tracks 204-205 depending on how the spacing between rows of seats 202-203 changes (see FIG. 2). Although engagement feature 408 is illustrated in FIG. 4 as a protrusion-type snap joint, engagement feature 408 may be modified as desired to correspond to different types of seat tracks that may be used in seat track system 200.

Figure 5:
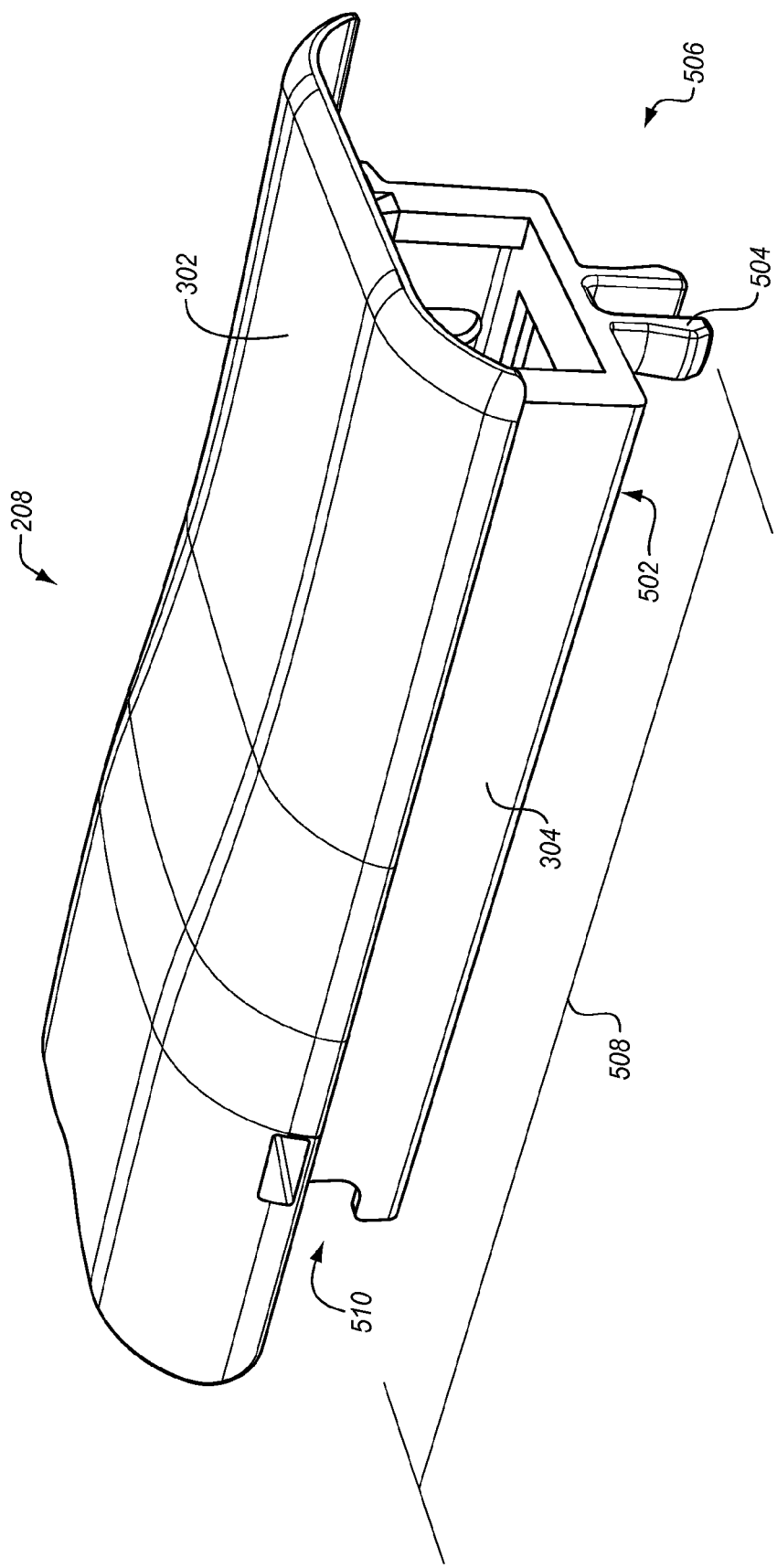
FIG. 5 is a diagrammatic representation of an interface in an exemplary embodiment.

FIG. 5 is a diagrammatic representation of interface 208 in an exemplary embodiment. In this view, interface 208 is shown with lid 302 in the closed position. In this embodiment, housing 304 of interface 208 includes a bottom side 502 that is configured to mount to seat tracks 204-205 and a front side 506 that faces an end of seat track cover 212. Disposed away from front side 506 along a length 508 of housing 304 is a back side 510, which is located proximate to legs 210 of rows of seats 202-203 (see FIG. 2).

In some embodiments, an engagement feature 504 is located along bottom side 502 of housing 304. Engagement feature 504 may comprise a snap-joint that allows interface 208 to be removably secured to seat tracks 204-205 (see FIG. 3). During a re-pitch, interface 208 may be removed from seat tracks 204-205 and re-positioned on seat tracks 204-205 depending on how the spacing between rows of seats 202-203 changes (see FIG. 2). Although engagement feature 504 is illustrated in FIG. 5 as a protrusion-type snap-joint, engagement feature 504 may be modified as desired to correspond to different types of seat tracks that may be used in seat track system 200.

Figure 6:
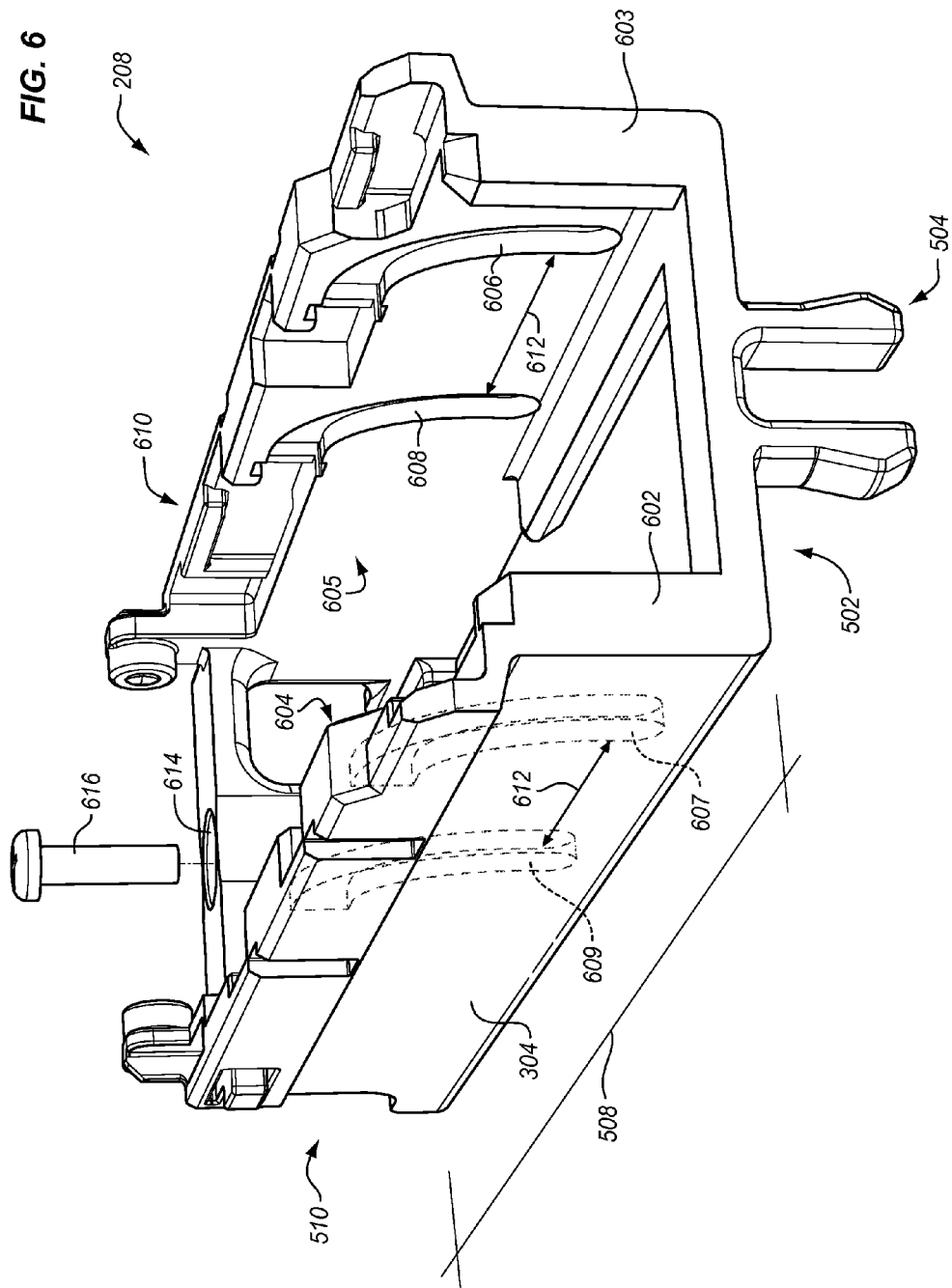
FIG. 6 is a diagrammatic representation of the interface of FIG. 5 with a lid removed in an exemplary embodiment.

FIG. 6 is a diagrammatic representation of interface 208 with lid 302 removed in an exemplary embodiment. With lid 302 removed in FIG. 6, more details of interface 208 are visible. Housing 304 of interface 208 includes side walls 602-603 that are disposed between a top side 610 of housing 304 and bottom side 502 of housing 304. In previous views, lid 302 covered top side 610 of housing 304. With lid 302 removed from interface 208, pairs of slots 606-607 and 608-609 are visible within an interior space of housing 304. Slot 607 and slot 609 are fabricated into interior surface 604 of side wall 602, and slot 606 and slot 608 are fabricated into interior surface 605 of side wall 603. Slots 606-609 extend from top side 610 of housing 304 toward bottom side 502 of housing 304, and are organized in pairs that are located across from each other within the interior space of housing 304. For instance, slot 606 at interior surface 605 of side wall 603 has a corresponding slot 607 at interior surface 604 of side wall 602. Slot 607 is not visible in this view, and is indicated as dashed lines in FIG. 6. In a similar manner, slot 608 at interior surface 605 of side wall 603 has a corresponding slot 609 at interior surface 604 of side wall 602. Slot 609 is not visible in this view, and is indicated as dashed lines in FIG. 6.

Slots 606-607 and slots 608-609 have a spacing 612 apart from each other along length 508 of housing 304. For example, slots 606-607 may be spaced apart from slots 608-609 by about an inch, which allows for movement along length 508 of an electrical connector for rows of seats 202-203 to compensate for changes in a distance between seat track cover 212 and leg 210 (see FIG. 2). This will be discussed in more detail later.

Also illustrated in FIG. 6 near back side 510 of housing 304 is an engagement feature 614 that is configured to secure housing 304 of interface 208 to leg 210 (see FIG. 3). Engagement feature 614 may allow a retainer 616 (e.g., a screw, bolt, or some other type of removable securement) to affix housing 304 to leg 210.

Figure 7:
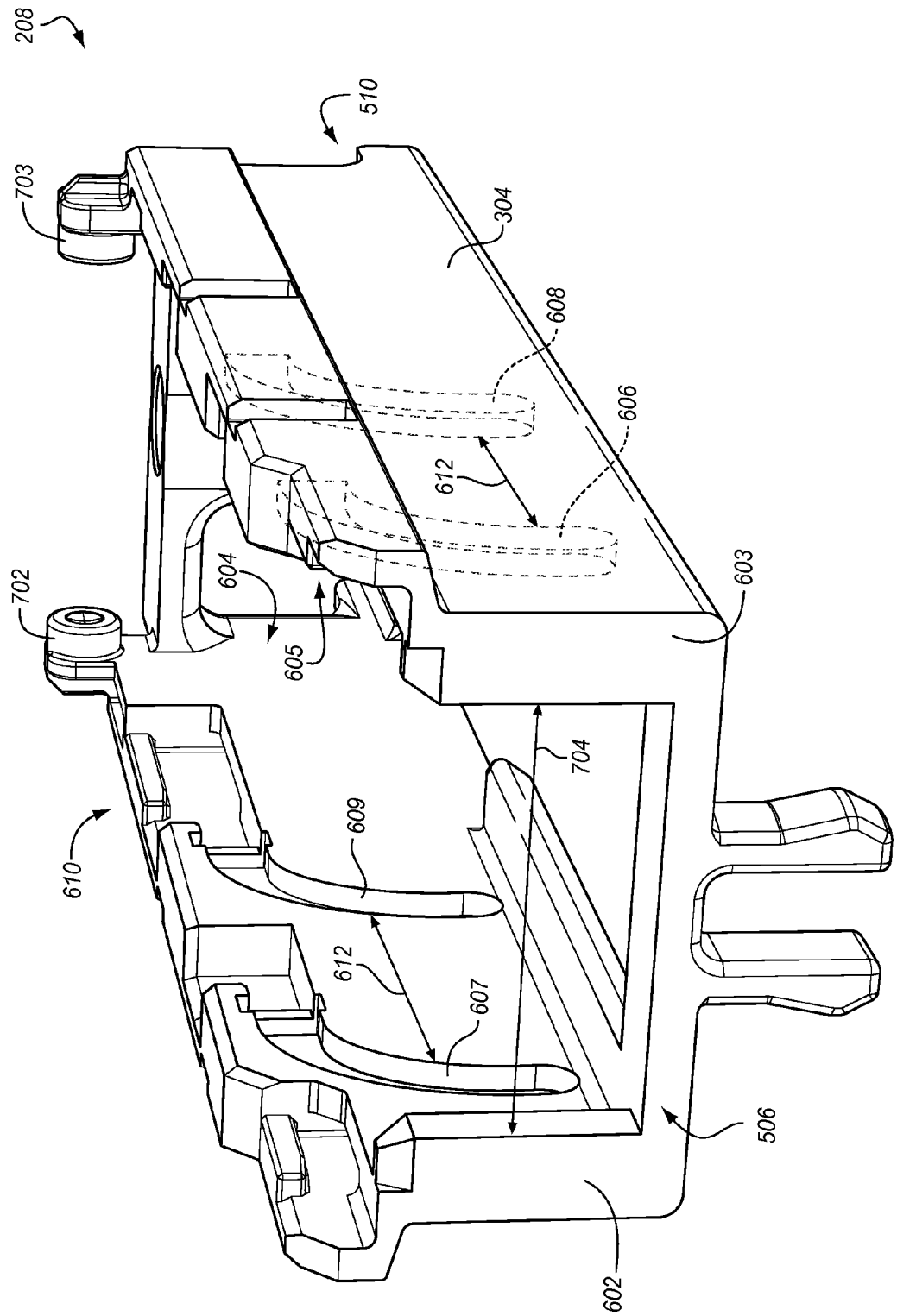
FIG. 7 is a diagrammatic representation of another view of the interface of FIG. 6 with a lid removed in an exemplary embodiment.

FIG. 7 is a diagrammatic representation of another view of interface 208 with lid 302 removed in an exemplary embodiment. In FIG. 7, slot 607 and slot 609 are now visible, and slot 606 and slot 608 are now hidden. FIG. 7 illustrates that slot 607 and slot 609 are located along interior surface 604 of side wall 602, and are separated along interior surface 604 by spacing 612.

Also illustrated in FIG. 7 is a pair of engagement features 702-703 near back side 510 that are configured to couple to lid 302. Engagement features 702-703 secure lid 302 to housing 304, and allow lid 302 to rotate into an up position relative to housing 304. This exposes top side 610 of housing 304 and the interior space within housing 304.

As discussed previously, a re-pitch may result in a spacing change between rows of seats 202-203 onboard aircraft 100. In prior seat track systems, a re-pitch may result in the seat track covers being either too long or too short to fit between the rows of seats. Interface 208 of seat track system 200 allows for an adjustment to the spacing between rows of seats 202-203 without discarding the seat track covers 212 (see FIG. 2). This adjustment is based on spacing 612 between slots 606-607 and slots 608-609.

For instance, if interface 208 proximate to row of seats 202 is removed, and row of seats 202 is moved towards row of seats 203, then a decreased spacing would exist between leg 210 and the closest end of track cover 212 (see FIG. 3). In prior seat track systems, this spacing change would require discarding the seat track covers and refabricating new, shorter, seat track covers.

However, interface 208 is able to compensate for this spacing change utilizing two features. One feature is that an opening 704 in front side 506 of interface 208 is sized to allow a portion of seat track cover 212 to slide within the interior space of housing 304. For instance, end 406 of seat track cover 212 (see FIG. 4) is able to slide within the interior space of housing 304 to compensate for the shorter distance between leg 210 of row of seats 202 and seat track cover 212 (see FIG. 2).

Another feature that allows interface 208 to compensate for the spacing change is provided by slots 606-609 that are present along interior surfaces 604-605 of housing 304. As end 406 of seat track cover 212 (see FIG. 4) moves within the interior space of housing 304 towards leg 210 of row of seats 202 (see FIG. 2), electrical connector 404 at end 406 moves closer to leg 210 of row of seats 202. Slots 606-609 allows an electrical connector for row of seats 202 (not shown) to be positioned at either slots 606-607 or at slots 608-609 to enable an electrical connection to be made between row of seats 202 and seat track cover 212.

Figure 8:
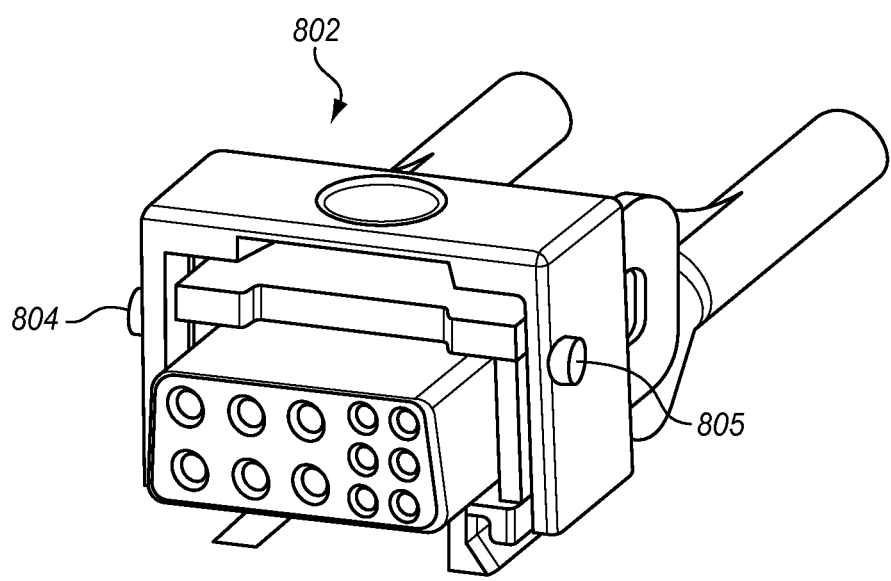
FIG. 8 is a diagrammatic representation of an electrical connector for a row of seats that is configured to removably mount to slots in the interface of FIG. 5 in an exemplary embodiment.

FIG. 8 is a diagrammatic representation of an electrical connector 802 for a row of seats (e.g., rows of seats 202-203) that is configured to removably mount to slots 606-607 or slots 608-609 of interface 208 in an exemplary embodiment (see FIGS. 6-7). In this embodiment, electrical connector 802 includes a pair of projections 804-805 that are configured to slide within either slots 606-607 or slots 608-609 depending on the spacing change that is made between leg 210 of row of seats 202 and seat track cover 212 (see FIG. 2). Electrical connector 802 is configured to electrically connect to electrical connector 404 at end 406 and/or electrical connector 405 at end 407 of seat track cover 212 (see FIG. 4).

If the distance decreases between leg 210 of row of seats 202 and seat track cover 212 (see FIG. 2), then electrical connector 802 may be moved to a pair of slots that is located closer to leg 210 within interface 208 (e.g., slots 608-609 of FIGS. 6-7). If the distance increases between leg 210 of row of seats 202 and seat track cover 212, then electrical connector 802 may be moved to a pair of slots that are located farther away from leg 210 within interface 208 (e.g., slots 606-607). This type of adjustment allows for distance changes between rows of seats 202-203 to occur without discarding seat track covers 212. The adjustment capability depends upon spacing 612 between the pairs of slots 606-607 and 608-609 along length 508 of housing 304 (see FIGS. 6-7), and the number of pairs of slots that are located along length 508 of housing 304. For instance, although only two pairs of slots are illustrated in FIGS. 6-7; interface 208 may include three, four, or more pairs of slots as desired. Further, the distances between the pairs of slots may be constant or vary over length 508 of housing 304 as desired.

Since interface 208 is located on both sides of seat track cover 212 along seat tracks 204-205 (see FIG. 3), adjustments at both ends 406-407 of seat track cover 212 are possible (see FIG. 4). For instance, rows of seats 202-203 (see FIG. 2) may move toward or away from each other and adjustments would be available in either case.

During a re-pitch, rows of seats 202-203 onboard aircraft 100 may be repositioned along seat tracks 204-205 (see FIG. 2). Interface 208 allows for the re-use of the existing seat track covers (e.g., seat track covers 212) utilizing the adjustable nature of interface 208. This reduces both the time and costs associated with a re-pitch.

Although specific embodiments were described herein, the scope is not limited to those specific embodiments. Rather, the scope is defined by the following claims and any equivalents thereof.

The invention claimed is:

1. An apparatus configured to couple an electrical connector of a seat to an electrical connector that is disposed on an end of a seat track cover, the apparatus comprising:
   an elongated housing having a bottom side configured to mount to a seat track, an opposing top side having an opening, and side walls between the bottom side and the opposing top side;
   wherein the elongated housing has a front side configured to receive the end of the seat track cover within an interior space of the elongated housing, and a back side that is proximate to a leg of the seat;
   wherein surfaces of the side walls within the interior space include pairs of slots in opposition across the interior space that extend from the opposing top side toward the bottom side and have a spacing along a length of the elongated housing;
   wherein the pairs of slots are configured to receive the electrical connector of the seat, and to mate the electrical connector of the seat to the electrical connector of the seat track cover; and
   wherein the spacing of the pairs of slots along the length of the elongated housing defines a variable distance between the end of the seat track cover and the leg of the seat.

2. The apparatus of claim 1 wherein:
   the seat track has a planar surface that includes a plurality of openings that are spaced along a length of the seat track; and
   the bottom side of the elongated housing includes an engagement feature that is configured to secure the elongated housing to at least one of the plurality of openings in the planar surface of the seat track.

3. The apparatus of claim 2 wherein:
   the engagement feature comprises a snap joint that is configured to secure the elongated housing to the at least one of the plurality of openings in the planar surface of the seat track.

4. The apparatus of claim 1 further comprising:
   an engagement feature that is proximate to the back side of the elongated housing that is configured to secure the elongated housing to the leg of the seat.

5. The apparatus of claim 4 wherein:
   the engagement feature is configured to receive a retainer that secures the elongated housing to the leg of the seat.

6. The apparatus of claim 1 further comprising:
   a lid rotatably attached proximate to the back side of the elongated housing that is configured to cover the opening on the opposing top side of the elongated housing.

7. The apparatus of claim 1 wherein:
   the interior space includes at least three pairs of slots in opposition across the interior space that are spaced along the length of the elongated housing.

8. An apparatus for communicating electrical signals between mobile seats that are spaced apart, the apparatus comprising:
   a seat track, wherein the mobile seats are affixed to the seat track utilizing seat legs;
   a seat track cover mounted to the seat track between the seat legs, wherein the seat track cover includes wiring that electrically couples connectors at apposing ends; and
   a pair of interfaces, each interface disposed between one of the seat legs and one of the ends of the seat track cover, each interface comprising:
   an elongated housing having a bottom side configured to mount to the seat track, a top side opposing the bottom side that has an opening, and side walls between the bottom side and the top side;
   wherein the elongated housing has a front side configured to receive one of the ends of the seat track cover within an interior space of the elongated housing, and a back side that is proximate to one of the seat legs;
   wherein surfaces of the side walls within the interior space include pairs of slots in opposition across the interior space that extend from the top side toward the bottom side and have a spacing along a length of the elongated housing;
   wherein the pairs of slots are configured to receive an electrical connector for one of the mobile seats, and to mate the electrical connector of one of the mobile seats to one of the connectors of the seat track cover; and
   wherein the spacing of the pairs of slots along the length of the elongated housing defines a variable distance between one of the ends of the seat track cover and one of the seat legs.

9. The apparatus of claim 8 wherein:
   the seat track has a planar surface that includes a plurality of openings that are spaced along a length of the seat track; and
   the bottom side of the elongated housing includes an engagement feature that is configured to secure the elongated housing to at least one of the plurality of openings in the planar surface of the seat track.

10. The apparatus of claim 9 wherein:
    the engagement feature comprises a snap joint that is configured to secure the elongated housing to the at least one of the plurality of openings in the planar surface of the seat track.

11. The apparatus of claim 8 further comprising:
    an engagement feature that is proximate to the back side of the elongated housing, wherein the engagement feature is configured to secure the elongated housing to one of the seat legs.

12. The apparatus of claim 11 wherein:
    the engagement feature is configured to receive a retainer that secures the elongated housing to one of the seat legs.

13. The apparatus of claim 8 further comprising:
    a lid rotatably attached proximate to the back side of the elongated housing that is configured to cover the opening on the top side of the elongated housing.

14. A system comprising:
    a seat track;
    a first seat removably coupled to the seat track at a first seat leg;
    a second seat spaced apart from the first seat along the seat track that is removably coupled to the seat track at a second seat leg;
    a seat track cover mounted to the seat track between the first seat leg and the second seat leg that includes an electrical connector at a first end that is proximate to the first seat leg and an electrical connector at a second end that is proximate to the second seat leg;
    a first interface mounted to the seat track between the first seat leg and the first end of the seat track cover; and
    a second interface mounted to the seat track between the second seat leg and the second end of the seat track cover;

wherein the first interface is configured to receive the first end of the seat track cover within an interior space that includes pairs of slots in opposition across the interior space, wherein the pairs of slots are configured to receive an electrical connector of the first seat, and to mate the electrical connector of the first seat to the electrical connector at the first end of the seat track cover;

wherein the second interface is configured to receive an electrical connector of the second seat, and to mate the electrical connector of the second seat to the electrical connector at the second end of the seat track cover; and wherein a spacing for the pairs of slots along a length of the first interface defines a variable distance between the first end of the seat track cover and the first seat leg.

15. The system of claim 14 wherein:

the seat track has a planar surface that includes a plurality of openings that are spaced along a length of the seat track; and the first interface includes an engagement feature is configured to secure the first interface to at least one opening of the plurality of openings in the planar surface of the seat track.

16. The system of claim 15 wherein:

the engagement feature comprises a snap joint that is configured to secure the first interface to the at least one opening of the plurality of openings in the planar surface of the seat track.

17. The system of claim 14 wherein:

the first interface includes an engagement feature is configured to secure the first interface to the first seat leg.

18. The system of claim 17 wherein:

the engagement feature comprises a retaining screw.

19. The system of claim 14 wherein:

the interior space includes at least three pairs of slots in opposition across the interior space that are spaced along the length of the first interface.

20. The system of claim 14 wherein:

the first interface includes a removable lid that is configured to cover the interior space.

* * * * *